Patented Dec. 26, 1950

2,535,987

UNITED STATES PATENT OFFICE 2,535,987

AMINOMETHYL COMPOUNDS OF THE POLYCYCLIC DIKETO SERIES AND N-PHTHALOYL DERIVATIVES THEREOF

David I. Randall and Saul R. Buc, Easton, Pa., assignors to General Aniline & Film Corporation, New York, N. Y., a corporation of Delaware No Drawing. Application November 16, 1948, Serial No. 60,397

8 Claims. (Cl. 260—326)

This invention relates to phthalimidomethyl derivatives of the polycyclic diketo series consisting of from 6 to 10 fused benzene rings, the corresponding phthalamic acids and aminomethyl derivatives, and to a process of preparing the same.

We have found that polycyclic diketo compounds consisting of at least 6 fused benzene rings readily react with N-hydroxymethylphthalimides in the presence of concentrated sulfuric acid or oleum to yield compounds containing a phthalimidomethyl group as a nuclear substituent. The latter group is subjected to hydrolysis as hereinafter described to yield phthalamic acid and aminomethyl derivatives of such compounds. The new compounds obtained in accordance with the present invention are not only valuable as dyestuff intermediates, colorants, and pigments, but on base splitting of the phthalamic acid yield dyestuff intermediates which are also useful as colorants.

It is an object of the present invention to provide phthalimidomethyl dyestuff intermediates of the polycyclic diketo compounds consisting of at least 6 fused benzene rings.

A further object is to provide aminomethyl and phthalamic acid derivatives from said dyestuff intermediates by hydrolysis.

A still further object is to provide a process of preparing said dyestuff intermediates and the hydrolysis products thereof.

Other objects and advantages will become apparent from the following description.

The above and other objects are accomplished by condensing a polycyclic diketo compound consisting of from 6 to 10 fused benzene rings and selected from the class consisting of dibenzopyrenequinone, anthanthrone, mesobenzo-dianthrone, meso-naphthodianthrone, meso-anthro-dianthrone, pyranthrone, isopyranthrone, dibenzo-pyranthrone, violanthrone, isoviolanthrone, and the like, with an N-hydroxymethylphthalimide in the presence of sulfuric acid or oleum, or a mixture thereof.

In practicing the invention a gram mol of any one of the polycyclic diketo compounds referred to above is dissolved in concentrated sulfuric acid or oleum, or a mixture of both, at a temperature ranging from 10 to 60° C. and to the solution is added 1 or more molecular equivalent of N-hydroxymethylphthalimide. The mixture is allowed to stand, preferably with stirring, for a period of time ranging from 30 minutes to 48 hours and at a temperature between 10° and 70° C. After the condensation reaction is complete, the reaction mixture is then poured over ice, the precipitate filtered off, washed several times with water, and dried. The precipitated product may be used as such as a dyestuff intermediate or subjected to hydrolysis as hereinafter described to yield phthalamic acid and aminomethyl derivatives.

The N-hydroxymethylphthalimides which may be employed are N-hydroxymethylphthalimide itself, a substituted N-hydroxymethylphthalimide wherein one or more substituents may be present in the 3- to 6-positions of the benzene nucleus. Thus, there are included such representative N-hydroxymethylphthalimides as:

N-hydroxymethyl-3-methylphthalimide
N-hydroxymethyl-4-methylphthalimide
N-hdroxymethyl-4,5-dibromophthalimide
N-hydroxymethyl-4-chlorophthalimide
N-hydroxymethyl-3,4-dichlorophthalimide
N-hydroxymethyl-3-nitrophthalimide
N-hydroxy-4-nitrophthalimide Instead of employing an N-hydroxymethylphthalimide in the condensation reaction, molecular equivalents of phthalimide and formaldehyde or a formaldehyde-producing compound, such as paraformaldehyde, may be used.

It is not certain where the point of attachment of the entering phthalimidomethyl group is. While we are not restricting ourselves to any theory as to the mechanism of the reaction whereby the new dyestuff intermediates are produced and while no positive proof of the position of the substituent group has been established, we have assumed that the phthalimidomethyl group enters the position which is normally taken by other groups when substituting the same polycyclic diketo nuclei. In the following examples, the probable positions occupied by the phthalimidomethyl group are indicated. It is to be understood that the utility of the compounds in accordance with this invention does not depend upon the exact structure.

Our invention will be more fully described in conjunction with the following specific examples. It should be understood, however, that the examples are given by way of illustration only and the invention is not to be limited by the details set forth therein.

*Example I*

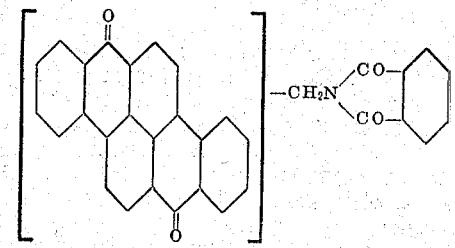

37.4 grams of N-hydroxymethylphthalimide and 33 grams of dibenzo[a,h]pyrene-7,14-dione (Indanthrene Golden Yellow GK) were dissolved in a solution consisting of 148 grams of 100% sulfuric acid and 155 grams of 20% oleum. The temperature was held at 55–60° C. for 1 hour, then at 30–35° C. for 12 hours. The condensation product was worked up by pouring into ice water, filtering and washing the filtrate from acid and drying at 80° C. The dried yellow material weighed 51.2 grams.

The point of attachment of the entering phthalimidomethyl group is assumed to be in the 12 position.

Example II

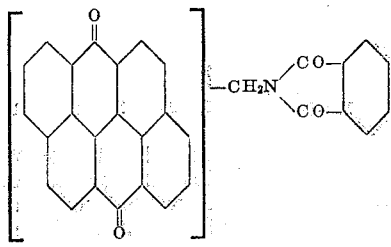

34.2 grams of 8,8'-bis-1-naphthoic acid were converted to dibenzo[cd,jk]pyrene-6,12-dione (anthanthrone) by solution in a mixture of 148 grams of 100% sulfuric acid and 155 grams of 20% oleum. 37.4 grams of N-hydroxymethylphthalimide were added and the mixture then treated exactly as in Example I. On working up the product, a yield of 52.7 grams of a yellow material was obtained.

The point of attachment of the entering phthalimidomethyl group is assumed to be in the 10 position of the anthanthrone nucleus. This is based on the observation that practically all other substitution reactions with anthanthrones take place at this position.

Example III

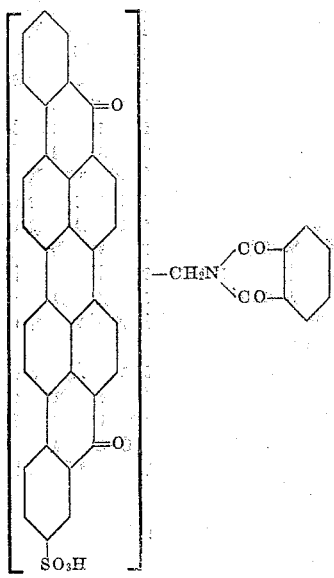

An intimate mixture of 18.7 grams of N-hydroxymethylphthalimide and 23 grams of violanthrone were dissolved in a solution consisting of 100 cc. of 100% sulfuric acid and 100 cc. of 20% oleum at 10° C. After standing for 12 hours at 25° C., the solution was worked up as in Example I and 40 grams (100% of theory) of a dark violet powder were obtained. The analyses indicate that the phthalimidomethyl and sulfonic acid groups entered the 3 and 12 positions, respectively, of the violanthrone nucleus. It is not at all soluble in boiling water, but dissolves readily in a dilute base with an intense violet coloration.

The following example illustrates the alkaline hydrolysis of the polycyclic diketo dyestuff intermediates containing a methylphthalimido group as a nuclear substitution to the corresponding phthalamic acid alkali metal salt and the conversion thereof to the free acid.

Example IV

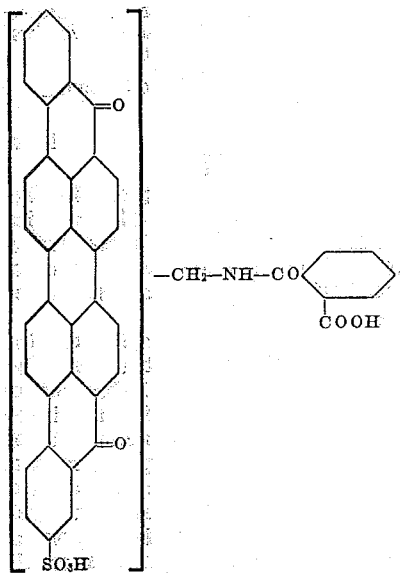

Hydrolysis to the phthalamic acid was readily brought about by refluxing 20 grams of the condensation product of Example III in 300 cc. of ethanol containing 11 grams of the dissolved potassium hydroxide for 5 minutes. This solution was poured into 1.5 liters of hot water, then heated to 100° C. and filtered. The filtrate was acidified with hydrochloric acid and the resulting violet flocculent precipitate filtered off. The weight of the phthalamic acid was 15 grams.

The following examples illustrates the acid hydrolysis of the polycyclic diketo compounds containing a phthalimidomethyl group of a nuclear substituent to the corresponding aminomethyl derivatives.

Example V

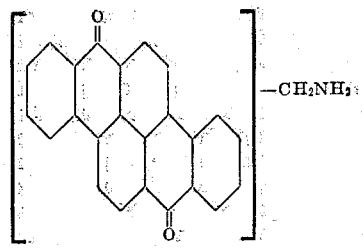

14.5 grams of the purified condensation product of Example II were dissolved in 150 cc. of 96% sulfuric acid. The acid strength was diluted to 80% by the addition of 55 cc. of water. The solution was held at a temperature of 140–145° C. for 2 hours. During this heating period, the sublimation of a considerable quantity of phthalic anhydride was noted. After cooling to 50° C., the orange solution was poured into 2 liters of cold water. The sulfate of the amine was isolated by filtering off the yellow precipitate.

While we have disclosed the preferred embodiments of our invention and the preferred modes of carrying the same into effect, it will be readily apparent to those skilled that many variations may be made therein without departing from the spirit thereof. Accordingly, the scope of our in-

We claim:
1. A polycyclic diketo compound selected from the class consisting of dibenzo-pyrenequinone, anthanthrone, meso-benzo-dianthrone, meso-naphtho-dianthrone, meso-anthro-dianthrone, pyranthrone, isopryranthrone, dibenzo-pyranthrone, violanthrone and isoviolanthrone, said compound containing a member selected from the class consisting of phthalimidomethyl, aminomethyl, and o-carboxybenzoylaminomethyl groups as the only nuclear substituent.

2. A dibenzo[a,h]pyrene-7,14-dione dyestuff intermediate characterized by the following formula:

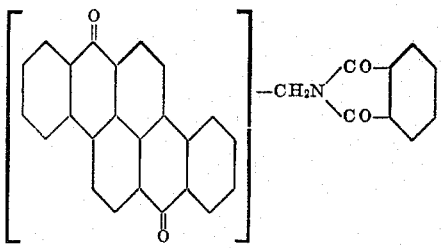

3. A dibenzo[cd,jk]pyrene-6,12-dione dyestuff intermediate characterized by the following formula:

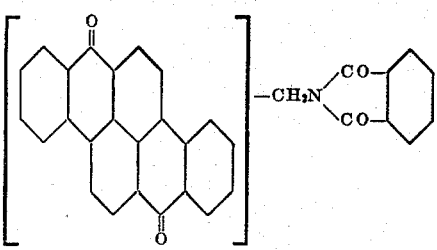

4. A violanthrone dyestuff intermediate characterized by the following formula:

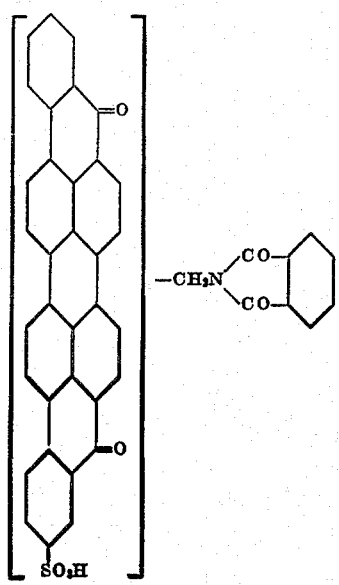

5. The process of preparing a phthalimidomethyl derivative of otherwise unsubstituted polycyclic diketo compounds which comprises condensing, in the presence of at least one member of the group consisting of concentrated sulfuric acid and oleum, an N-hydroxymethylphthalimide with a polycyclic diketo compound selected from the class consisting of dibenzopyrenequinone, anthranthrone, meso-benzodianthrone, meso-naphtho-dianthrone, meso-anthrodianthrone, pyranthrone, isopyranthrone, dibenzo-pyranthrone, violanthrone and isoviolanthrone.

6. The process of preparing a phthalimidomethyl derivative of dibenzo[a,h]pyrene-7,14-dione which comprises condensing, in the presence of at least one member of the group consisting of concentrated sulfuric acid and oleum, one mol of said dione with one mol of N-hydroxymethylphthalimide.

7. The process of preparing a phthalimidomethyl derivative of benzo[cd,jk]pyrene-6,12-dione which comprises condensing, in the presence of at least one member of the group consisting of concentrated sulfuric acid and oleum, one mol of said dione with one mol of N-hydroxymethylphthalimide.

8. The process of preparing a phthalimidomethyl derivative of violanthrone which comprises condensing, in the presence of at least one member of the group consisting of concentrated sulfuric acid and oleum, one mol of violanthrone with one mol of N-hydroxymethylphthalimide.

DAVID I. RANDALL.
SAUL R. BUC.

REFERENCES CITED

The following references are of record in the file of this patent:

UNITED STATES PATENTS

| Number | Name | Date |
|---|---|---|
| 1,946,829 | Bayer | Feb. 13, 1934 |

FOREIGN PATENTS

| Number | Country | Date |
|---|---|---|
| 127,927 | Switzerland | Sept. 17, 1928 |
| 507,049 | Germany | Sept. 15, 1930 |
| 141,211 | Switzerland | Sept. 16, 1930 |
| 511,951 | Germany | Nov. 3, 1930 |
| 753,976 | France | Aug. 21, 1933 |

OTHER REFERENCES

Beilstein (4th ed.), vol 21, p. 467.

Certificate of Correction

Patent No. 2,535,987 December 26, 1950

DAVID I. RANDALL ET AL.

It is hereby certified that error appears in the printed specification of the above numbered patent requiring correction as follows:

Column 4, Example V, for that portion of the formula reading

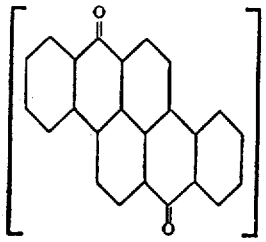 read 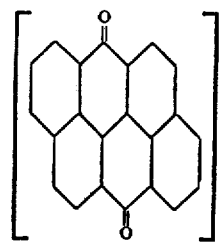

column 5, lines 30 to 39, inclusive, for that portion of the formula reading

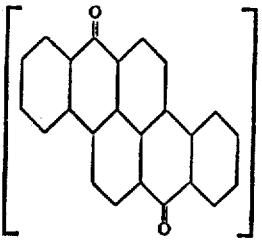 read 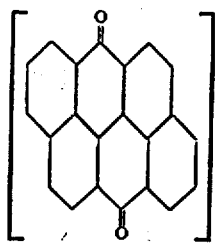

and that the said Letters Patent should be read as corrected above, so that the same may conform to the record of the case in the Patent Office.

Signed and sealed this 27th day of February, A. D. 1951.

[SEAL]

THOMAS F. MURPHY,
Assistant Commissioner of Patents.